United States Patent
Chuck et al.

(10) Patent No.: US 10,724,475 B2
(45) Date of Patent: Jul. 28, 2020

(54) DUAL TURN THRUST REVERSER CASCADE SYSTEMS AND METHODS

(71) Applicant: The Boeing Company, Chicago, IL (US)

(72) Inventors: Chen Chuck, Mercer Island, WA (US); Zachariah B. VanDeMark, Snohomish, WA (US)

(73) Assignee: THE BOEING COMPANy, Chicago, IL (US)

( * ) Notice: Subject to any disclaimer, the term of this patent is extended or adjusted under 35 U.S.C. 154(b) by 809 days.

(21) Appl. No.: 15/277,900

(22) Filed: Sep. 27, 2016

(65) Prior Publication Data

US 2018/0087474 A1 Mar. 29, 2018

(51) Int. Cl.
| | | |
|---|---|---|
| *F02K 1/70* | (2006.01) | |
| *F02K 1/72* | (2006.01) | |
| *F02K 1/76* | (2006.01) | |

(52) U.S. Cl.
CPC ............... *F02K 1/70* (2013.01); *F02K 1/72* (2013.01); *F02K 1/763* (2013.01); *F05D 2240/129* (2013.01); *F05D 2250/312* (2013.01); *F05D 2250/711* (2013.01); *F05D 2260/50* (2013.01); *Y02T 50/671* (2013.01)

(58) Field of Classification Search
CPC ... F02K 1/70; F02K 1/72; F02K 1/625; F05D 2240/129
See application file for complete search history.

(56) References Cited

U.S. PATENT DOCUMENTS

| | | | | |
|---|---|---|---|---|
| 3,503,211 A | * | 3/1970 | Holman | F02K 1/72 239/265.29 |
| 4,073,440 A | * | 2/1978 | Hapke | F02K 1/74 239/265.29 |
| 5,090,197 A | * | 2/1992 | Dubois | F02K 1/70 239/265.27 |
| 8,720,183 B2 | | 5/2014 | Welch et al. | |
| 2005/0151012 A1 | * | 7/2005 | Lair | F02K 1/70 244/110 B |
| 2011/0101158 A1 | * | 5/2011 | Welch | B21D 53/92 244/110 B |
| 2013/0067884 A1 | * | 3/2013 | Bhatt | F02K 1/72 60/204 |
| 2014/0117106 A1 | * | 5/2014 | Acheson | F02K 1/766 239/11 |
| 2015/0308380 A1 | * | 10/2015 | Biset | F02K 1/32 60/226.2 |
| 2016/0222917 A1 | * | 8/2016 | Segat | B64D 33/04 |
| 2017/0057166 A1 | * | 3/2017 | Soria | F02K 1/56 |
| 2017/0175674 A1 | * | 6/2017 | Schrell | F02K 1/62 |
| 2017/0321631 A1 | * | 11/2017 | Calder | F02K 1/70 |
| 2017/0321632 A1 | * | 11/2017 | Howarth | F02K 1/72 |

* cited by examiner

*Primary Examiner* — Andrew H Nguyen
(74) *Attorney, Agent, or Firm* — Haynes and Boone, LLP

(57) ABSTRACT

Systems and methods are provided for a thrust reverser system with a straight vane thrust reverser cascade. The thrust reverser system may also include a blocker door and a turning door. The blocker door may divert air flowing within a bypass flow path of the aircraft propulsor to flow through the thrust reverser cascade. The turning door may then deflect air flowing from the thrust reverser cascade to provide reverse thrust. The straight vane thrust reverser cascade may allow for increased reverse thrust and/or a smaller, more efficient, aircraft propulsor.

18 Claims, 13 Drawing Sheets

DUAL TURN THRUST REVERSER CASCADE SYSTEMS AND METHODS

TECHNICAL FIELD

The disclosure relates generally to aircrafts and more specifically to aircraft thrust reversers.

BACKGROUND

Aircraft propulsor thrust reversers deflect air against the direction of travel to provide reverse thrust. One type of thrust reverser includes cascades in the area where airflow exits from within the aircraft propulsor.

SUMMARY

Systems and methods are disclosed herein for an aircraft propulsor. In certain examples, the aircraft propulsor may include a nacelle including a thrust reverser aperture, a core engine circumscribed by the nacelle and including a plurality of fan blades configured to rotate around a first axis, wherein the nacelle and the core engine define, at least in part, a bypass flow path configured to direct airflow from the plurality of fan blades of the core engine, a thrust reverser cascade configured to be at least partially disposed within the thrust reverser aperture, including a plurality of straight cascade vanes coupled to the nacelle, arranged substantially orthogonal to the first axis, and configured to permit airflow from the bypass flow path through the cascade vanes, a blocker door disposed between the nacelle and the core engine and configured to move between at least a first blocker door position and a second blocker door position, wherein the blocker door in the first blocker door position blocks at least a portion of the bypass flow path, and a turning door disposed within the thrust reverser aperture and configured to move between at least a first turning door position and a second turning door position, wherein the turning door in the first turning door position is configured to deflect airflow from the cascade vanes to a direction with a component opposite that of airflow within the bypass flow path.

In certain examples of the aircraft propulsor, the blocker door and the turning door may be coupled together. In certain such examples, the blocker door and the turning door may be coupled together via one or more drag links. In certain additional examples, the blocker door may be configured to move from the first blocker door position to the second blocker door position substantially simultaneously with the turning door moving from the first turning door position to the second turning door position.

In certain examples of the aircraft propulsor, the blocker door may be configured to move independently of the turning door. In certain examples of the aircraft propulsor, the thrust reverser cascade may be coupled to at least one of the blocker door and/or the turning door. In certain examples of the aircraft propulsor, the thrust reverser cascade may be configured to move between a first cascade position and a second cascade position, where at least the first cascade position is configured to permit airflow from the bypass flow path through the cascade vanes. In certain such examples, the thrust reverser cascade may be coupled to at least one of the blocker door and/or the turning door, may be configured to move to the first cascade position responsive to the blocker door moving to the first blocker door position and/or the turning door moving to the first turning door position, and may be configured to move to the second cascade position responsive to the blocker door moving to the second blocker door position and/or the turning door moving to the second turning door position.

In certain examples of the aircraft propulsor, the thrust reverser cascade may be fixed in a position where at least a portion of the thrust reverser cascade is disposed within the thrust reverser aperture. In certain examples of the aircraft propulsor, the turning door may be a first turning door and the aircraft propulsor may further comprise a second turning door. In certain such examples, the second turning door may be disposed between the thrust reverser cascade and the first turning door. In certain additional examples, the second turning door may be configured to move responsive to movement of the first turning door.

In certain examples of the aircraft propulsor, the direction with the component opposite that of airflow within the bypass flow path may be a direction approximately 135 degrees or more relative to the airflow energized by the core engine within the bypass flow path. In certain examples of the aircraft propulsor, the thrust reverser cascade is disposed circumferentially around the core engine. In certain other examples of the aircraft propulsor, the thrust reverser cascade further may further include angled and/or curved vanes, wherein at least a portion of the angled and/or curved vanes are parallel to the engine axis.

In certain examples, an aircraft including the aircraft propulsor may be provided. The aircraft may include a fuselage and a wing, where the aircraft propulsor is coupled to at least one of the fuselage and/or the wing.

In certain examples of the aircraft, the aircraft may further include a controller, communicatively coupled to the blocker door and/or the turning door and configured to provide instructions to move the blocker door between the first blocker door position and the second blocker door position and/or move the turning door between the first turning door position and the second turning door position.

In certain examples of the aircraft, the blocker door and the turning door may be coupled together and the controller may be communicatively coupled to the blocker door or the turning door. In certain examples of the aircraft, the blocker door may be configured to move independently of the turning door and the controller may be communicatively coupled to the blocker door and the turning door.

In certain other examples, a method may be disclosed. The method may include operating a core engine to direct airflow through at least a bypass flow path of an aircraft propulsor, moving a blocker door to a first blocker door position to flow air from the bypass flow path through a thrust reverser cascade comprising a plurality of straight cascade vanes, and moving a turning door to a first turning door position to deflect airflow from the cascade vanes to a direction with a component opposite that of airflow within the bypass flow path. In certain examples of the method, the blocker door and the turning door may be moved substantially simultaneously.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Aircraft propulsor with thrust reversers are described in the disclosure herein in accordance with one or more examples. The thrust reversers may include thrust reverser cascade with straight vanes that may increase the exit area of the thrust reverser cascade. In certain such examples, the thrust reverser may be a "dual turn" configuration such that airflow that passes through the straight vane thrust reverser cascade may be further deflected by one or more turning doors so that the deflected airflow may flow in a direction with a component opposite that of the direction of travel of the aircraft that the aircraft propulsor is coupled to. Such airflow may provide reverse thrust to slow the aircraft.

Figure 1A:
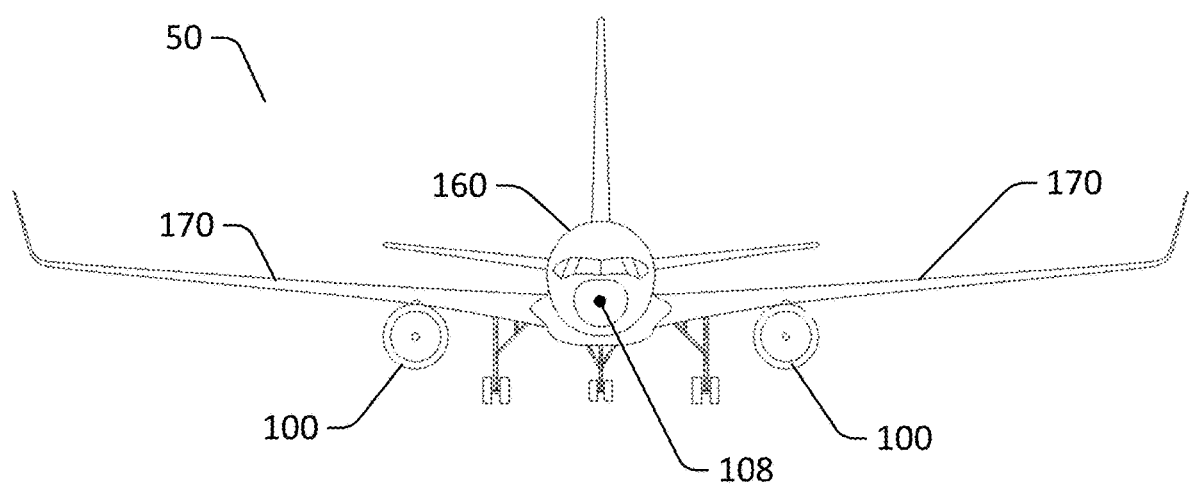
FIG. 1A illustrates a front view of an aircraft in accordance with an example of the disclosure.

FIG. 1A illustrates a front view of an aircraft in accordance with an example of the disclosure. FIG. 1A illustrates an aircraft 50 with a fuselage 160, wings 170, and aircraft propulsors 100. The aircraft propulsors 100 may be attached to the wings 170, but in other examples, the aircraft propulsors 100 may be attached to other portions of the aircraft 50 such as the fuselage 160.

Additionally, the aircraft 50 may include a controller 108. The various components of the aircraft 50 may be linked with the controller 108 to communicate commands (e.g., issued by the controller 108, from instructions from the pilot, and/or issued by the controller 108 responsive to instructions from the pilot) and conditions detected. The aircraft 50 described in FIG. 1 is exemplary and it is appreciated that in other examples, the aircraft 50 may include less or additional components. Additionally, concepts described herein may be extended to other aircraft such as helicopters, Unmanned Aerial Vehicles, etc. The controller may, for example, provide instructions to one or more blocker doors and/or one or more turning doors to move them between various positions. As such, the controller may, for example, provide instructions to one or more blocker doors to move between a first blocker door position and a second blocker door position, as well as, possibly other blocker door positions, and provide instructions to one or more turning doors to move between a first turning door position and a second turning door position, as well as, possibly other turning door positions. Certain controllers may provide instructions to the blocker doors and the turning doors at substantially the same period of time (e.g., both turning doors and blocker doors may be moving during at least one point in time), but other controllers may provide instructions to the blocker doors and the turning doors independently of each other.

The controller 108 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 108 and/or its associated operations may be implemented as a single device or multiple devices (e.g., communicatively linked through wired or wireless connections) to collectively constitute the controller 108.

The controller 108 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 108 may be adapted to execute instructions stored within the memory to perform various methods and processes described herein, including implementation and execution of control algorithms responsive to sensor and/or operator (e.g., flight crew) inputs.

Figure 1B:
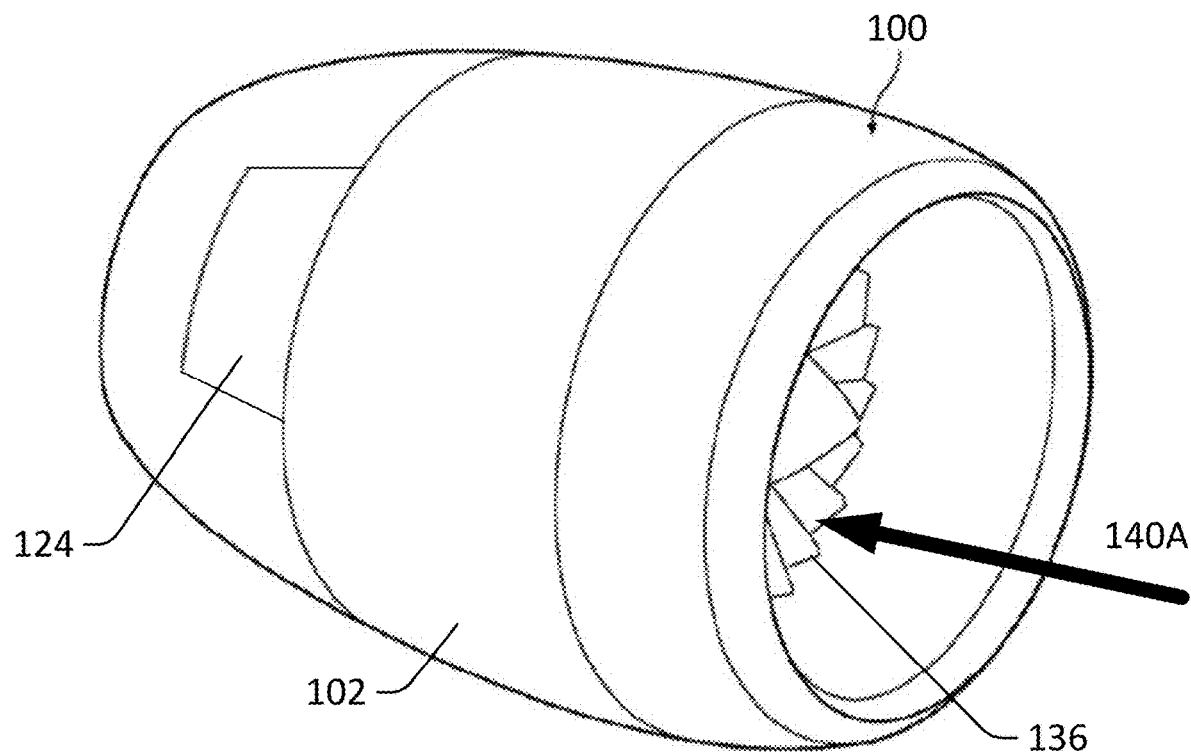
FIG. 1B illustrates a perspective view of an aircraft propulsor in accordance with an example of the disclosure.

FIG. 1B illustrates a perspective view of an aircraft propulsor in accordance with an example of the disclosure. Aircraft propulsor 100 may include a nacelle 102, a thrust reverser door 124, and a fan 136. In the example shown in FIG. 1B, the nacelle 102 may contain the fan 136, but other examples of the aircraft propulsor may arrange the fan so that the fan is not contained by the nacelle (e.g., in, for example, a turboprop configuration). The fan 136 may intake and/or energize air flowing into the nacelle 102, such as in an airflow direction 140A. Air that flows into the nacelle 102 via airflow direction 140A may flow through various internal flow paths within the nacelle 102. When the aircraft propulsor 100 is in a thrust reversing configuration, air that flows into the nacelle 102 in airflow direction 140A may be redirected to another direction to provide reverse thrust.

When the aircraft propulsor 100 is normally operating (e.g., providing forward thrust), the thrust reverser door 124 (e.g., a turning door) may be in a closed position that blocks the thrust reverser aperture 132 (shown in FIGS. 2-5 as thrust reverser aperture 132), sealing or substantially sealing the thrust reverser aperture 132 so that there is no or minimal airflow through the thrust reverser aperture 132. When the aircraft propulsor 100 is in a thrust reversing configuration (e.g., providing reverse thrust to, for example, slow the aircraft 50 that the aircraft propulsor 100 may attached to), the thrust reverser door 124 may be in an open position that does not block the thrust reverser aperture 132, allowing for air to flow through the thrust reverser aperture 132. In certain examples, the thrust reverser door 124 may form the thrust reverser aperture 132 when the thrust reverser door 124 is in the open configuration. In such an example, there may be no thrust reverser aperture 132 when the thrust reverser door 124 is in a closed configuration.

Figure 2A:
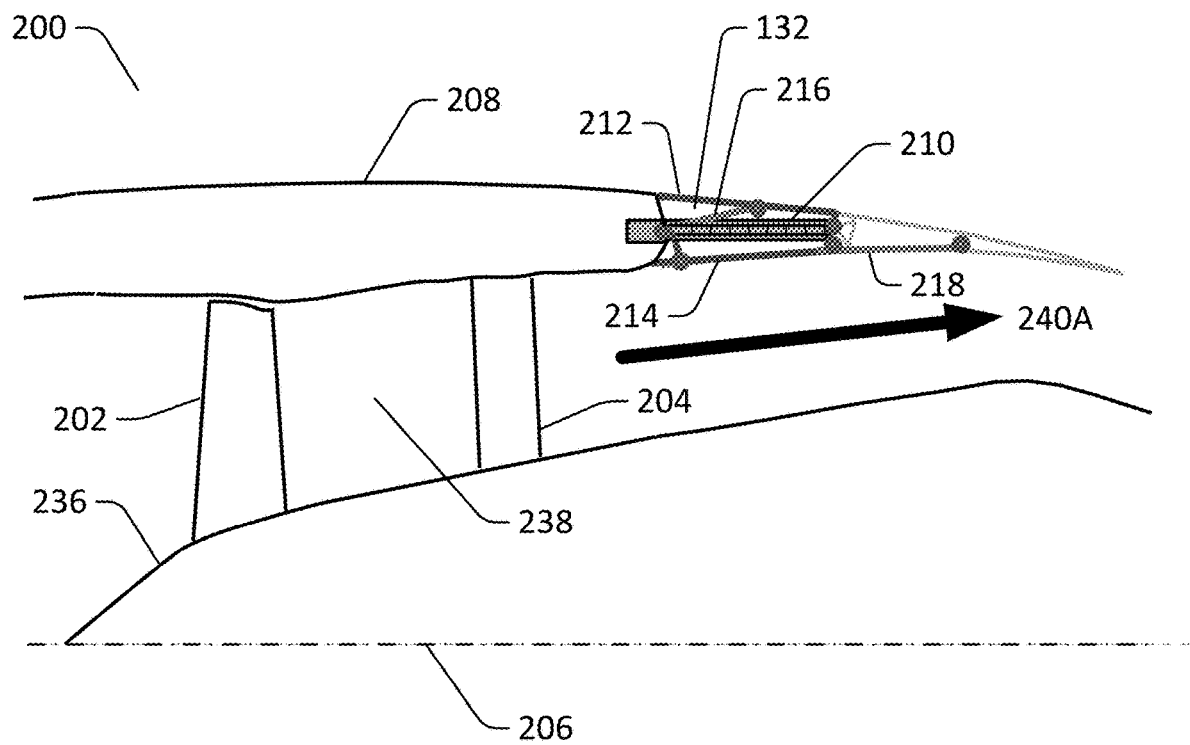
FIGS. 2A-B illustrate side cutaway views of an aircraft propulsor with a straight vane thrust reverser cascade in accordance with an example of the disclosure.
Figure 2B:
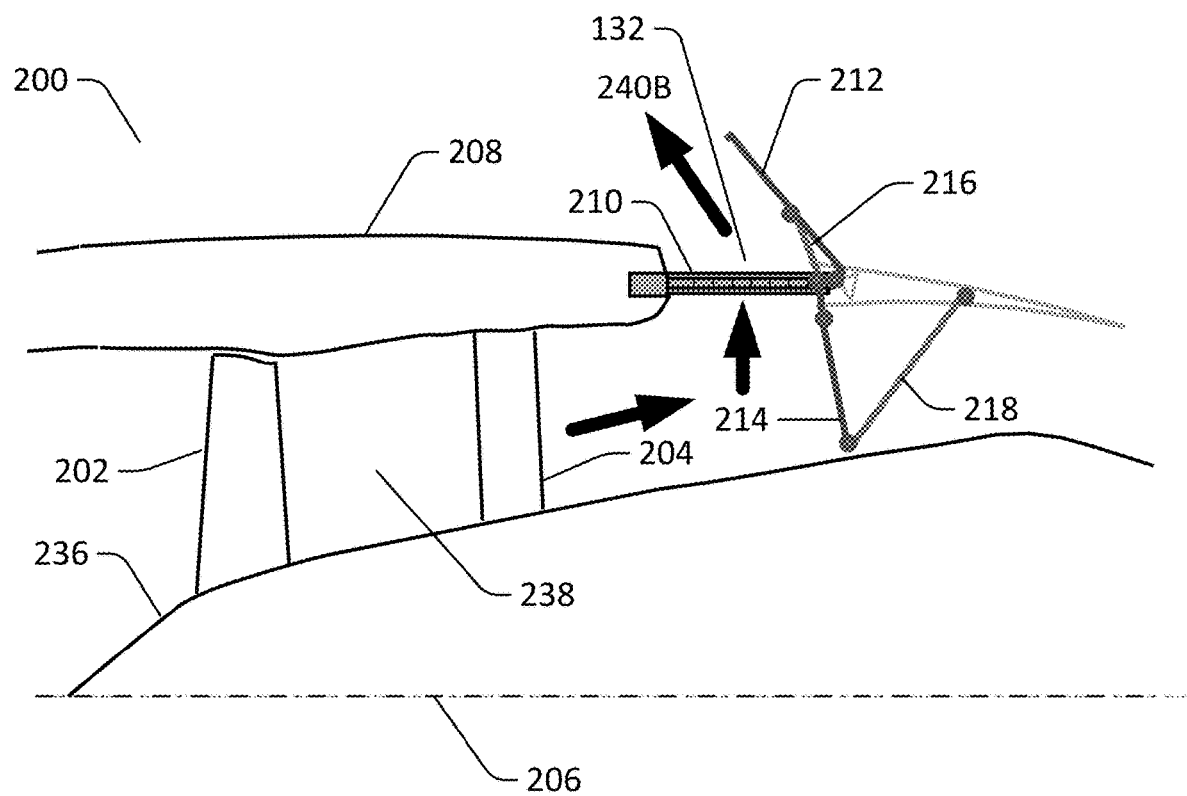

FIGS. 2A-B illustrate side cutaway views of an aircraft propulsor with a straight vane thrust reverser cascade in accordance with an example of the disclosure. FIGS. 2A and 2B may include the aircraft propulsor 200 with a core engine 236, a fan blade 202, a stator blade 204, a nacelle 208, a thrust reverser aperture 132, a thrust reverser cascade 210, a turning door 212, a blocker door 214, and links 216 and 218. The core engine 236, the fan blade 202, and the stator blade 204 may rotate around the axis 206.

The thrust reverser cascade 210 may have straight vanes perpendicular to the engine axis. As such, the vanes of the thrust reverser cascade 210 may be arranged substantially orthogonal (e.g., +/−5 degrees of orthogonal) to the axis 206. The straight vanes may maximize the open area of the thrust reverser cascade 210. As such, the straight vanes may allow a greater amount of air to flow through the thrust reverser cascade 210 than that of a thrust reverser cascade with curved vanes of the same outer area. Additionally, the straight vanes may be a shorter chord length than curved vanes and may, thus, reduce the weight of the thrust reverser cascade 210. In certain examples, the thrust reverser cascade 210 may include angled vanes that are aligned substantially parallel to the axis 206. In certain such examples, the thrust reverser cascade 210 may also include a transition portion to transition from vanes substantially orthogonal to the axis 206 to vanes substantially parallel to the axis 206.

In certain examples, the larger open area allows a straight vane thrust reverser cascade to flow greater amounts of air and thus, increase the amount of reverse thrust generated. In other examples, the larger open area may allow for a smaller thrust reverser cascade to be installed while flowing the same amount of air (and thus producing the same amount reverse thrust) as compared to a thrust reverser cascade with curved vanes. The smaller thrust reverser cascade may result in a more compact (e.g., shorter, lighter, and/or smaller diameter) aircraft propulsor. The more compact aircraft propulsor may be lighter, may result in lower drag, may be simpler (e.g., normal translating sleeves may be replaced by simpler turning doors), may reduce part counts due to simplicity and may, thus, result in fuel savings when operating an aircraft equipped with the smaller aircraft propulsor, as well as reduced production costs for the aircraft propulsor itself.

The nacelle 208 and the core engine 236 may define, at least in part, a bypass flow path 238. The bypass flow path 238 may be, for example, a path for bypass airflow 240A (e.g., airflow that does not flow through the combustion chamber or combustion chambers of the core engine 236) of the aircraft propulsor 200. The bypass airflow 240A may be energized by the fans of the core engine 236 (e.g., the fan blade 202, the stator blade 204, and/or other fans and/or fan blades of the core engine 236).

The bypass airflow 240A may, when the aircraft propulsor 200 is normally operating (e.g., providing forward thrust to the aircraft 50), flow through the entire length of the bypass flow path 238. When the aircraft propulsor 200 is in a thrust reverser configuration, the blocker door 214 may move to a first blocker door position to deflect at least a portion of the airflow within the bypass flow path 238 upward toward the thrust reverser cascade 210. In certain examples, the blocker door 214 may block at least a portion of the bypass flow path 238 when the blocker door 214 is in the first blocker door position. When the aircraft propulsor 200 is normally operating, the blocker door 214 may be in a second blocker door position. The second blocker door position may be a position that minimally disturbs airflow through the bypass flow path 238.

Before, during, and/or after the blocker door 214 has moved to the first blocker door position, the turning door 212 may move to a first turning door position. In the first turning door position, the turning door 212 may deflect airflow from the thrust reverser cascade 210. The airflow may be deflected such that it is flowing in a direction with a component opposite that of airflow within the bypass flow path 238 and/or the direction of travel of the aircraft 50 (e.g., between 91 to 180 degrees opposite such as 100 degrees opposite, 120 degrees opposite, 135 degrees opposite, 145 degrees opposite, or more than 145 degrees opposite the direction of airflow within the bypass flow path 238 and/or the direction of travel of the aircraft 50). As such, the deflected airflow may provide reverse thrust that may slow the aircraft 50. In certain other examples, fixed aft portions of the aircraft propulsor (e.g., a fixed nacelle portion) may also be shaped to further deflect airflow exiting the thrust reverser cascade 210 to generate reverse thrust. Additionally, in certain examples, a standard straight vane thrust reverser cascade 210 may be fitted to a plurality of different types of aircraft propulsors, and the thrust reversing characteristics of the plurality of different aircraft propulsors may be varied according to only blocker door and/or turning door designs.

During normal operation of the aircraft propulsor 200, the turning door 212 may be in a second turning door position. In the second turning door position, the turning door 212 may block the thrust reverser aperture 132 to prevent airflow through the thrust reverser aperture 132 and/or thrust reverser cascade 210. The turning door 212 in the second turning door position may also allow for smooth or substantially smooth airflow over the surface of the nacelle 208.

In certain examples, movement of the turning door 212 and the blocking door 214 may be linked via one or more links 216 and/or 218. The links may allow for the turning door 212 and blocking door 214 to be moved together, e.g., where at least a portion of movement of the turning door 212 and blocking door 214 occur simultaneously. Additionally, the links 216 and/or 218 may control positioning of the turning door 212 and/or the blocking door 214. In certain examples, a single motor and/or a combination of motors may operate the turning door 212, the blocking door 214, and/or the links 216 and/or 218 to move the turning door 212 and/or the blocking door 214 between the first blocking door position and the second blocking door position and the first turning door position and the second turning door position, respectively. Other examples may allow for the turning door 212 and the blocking door 214 to be moved independently of each other. In such examples, at least one motor may move the turning door 212 and at least another motor may move the blocking door 214. Other such examples may move the turning door 212 and the blocking door 214 with a single motor, e.g., with a torque transfer system to provide drive to the turning door 212 and/or the blocking door 213 from the motor. Certain other examples may include intermediate positions for the blocking door 214 and/or the turning door 212 (e.g., positions where, for example, less reverse thrust is produced). Also, certain examples of the aircraft propulsor 200 may include a plurality of blocking doors, turning doors, and/or links.

In the example shown in FIG. 2A, the turning door 212 may be in the second turning door position and the blocker door 214 may be in the second blocker door position. As such, the blocker door 214 may not impede or may minimally impede airflow through the bypass flow path 238 and the blocker door 214 and/or the turning door 212 may block airflow through the thrust reverser cascade 210. Thus, bypass airflow 240A may flow through the bypass flow path 238.

In the example shown in FIG. 2B, the turning door 212 may be in the first turning door position and the blocker door 214 may be in the first blocker door position. The blocker door 214 may deflect at least a portion of air flowing through the bypass flow path 240 through the thrust reverser cascade 210. The thrust reverser cascade 210 may include straight vanes and thus, airflow may exit the thrust reverser cascade 210 substantially orthogonal (e.g., +/−10 degrees from orthogonal) to the axis 206. The turning door 212 may then further deflect the airflow exiting the thrust reverser cascade 210 to a direction with a component normal to that of the direction of airflow within the bypass flow path 238 and/or the direction of travel of the aircraft 50, such as reverse airflow 240B, and thus provide reverse thrust. The reverse airflow 240B may initially flow through the bypass flow path 238, be deflected towards the thrust reverser cascade 210 by the blocker door 214, flow through the thrust reverser cascade 210, and be deflected again by the turning door 212 to provide reverse thrust.

Figure 3A:
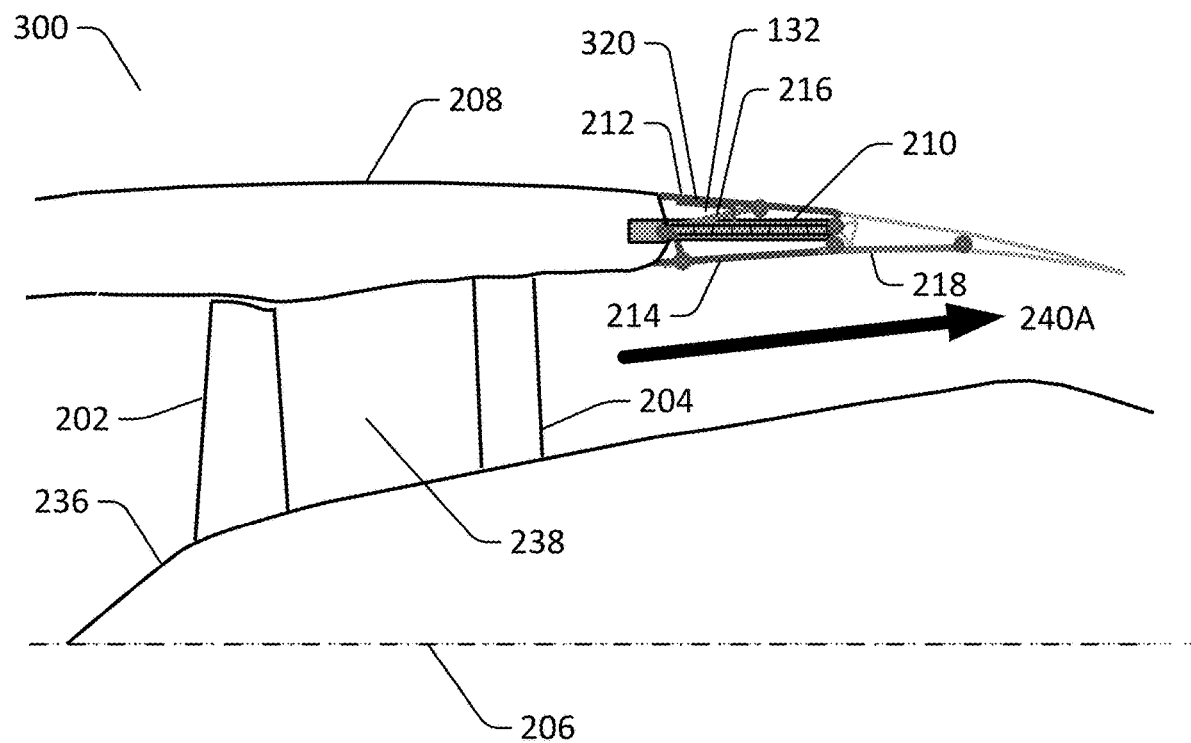
FIGS. 3A-B illustrate side cutaway views of another aircraft propulsor with a straight vane thrust reverser cascade in accordance with an example of the disclosure.
Figure 3B:
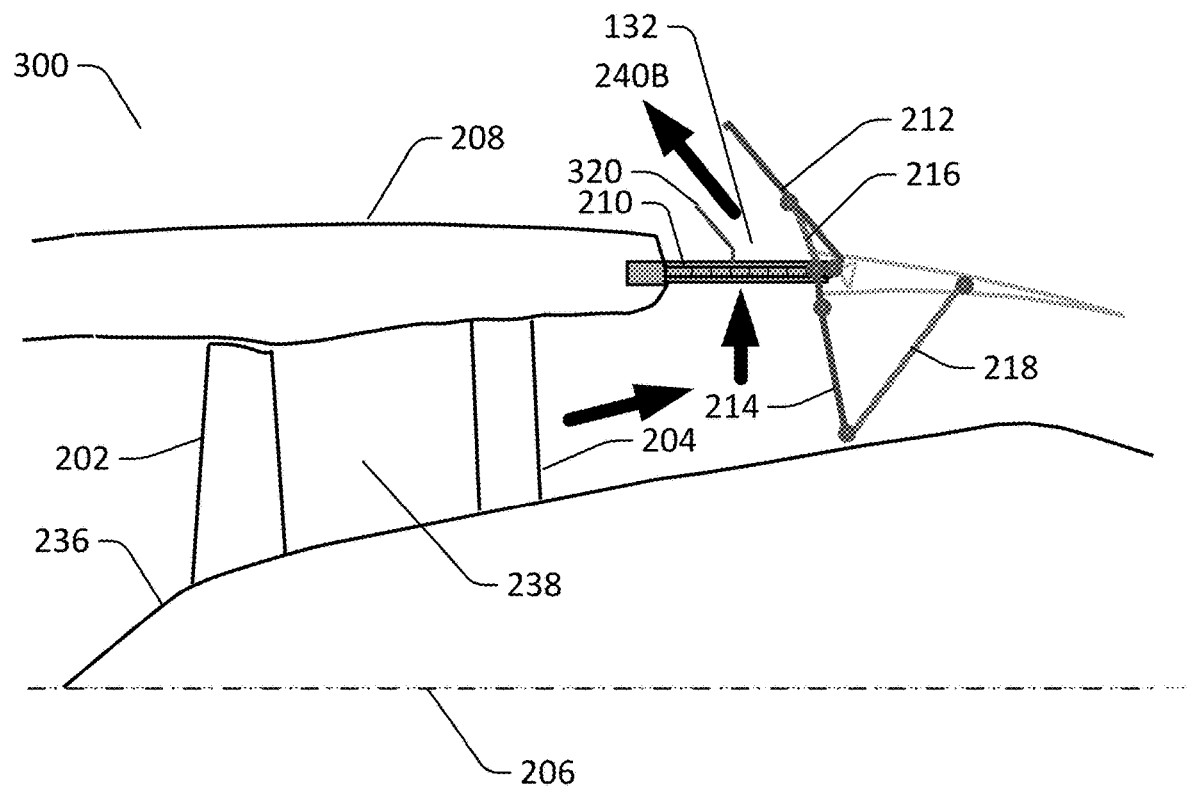

FIGS. 3A-B illustrate side cutaway views of another aircraft propulsor with a straight vane thrust reverser cascade in accordance with an example of the disclosure. The aircraft propulsor 300 of FIGS. 3A-B may be similar to that of the aircraft propulsor 200 of FIGS. 2A-B, but may additionally include a second turning door 320. The second turning door 320 may move between, at least, a closed position when, for example, the turning door 212 is in the second turning door position, to prevent airflow through the thrust reverser cascade 210, and an open position when, for example, the turning door 212 is in the first turning door position, to deflect airflow through the thrust reverser cascade 210. In certain examples, in the closed position, the turning door 212 may be stored between the thrust reverser cascade 210 and the turning door 212. The second turning door 320 may aid in the deflection of airflow from the thrust reverser cascade 210 to a direction with a component opposite that of airflow within the bypass flow path 238 and/or the direction of travel of the aircraft 50.

Figure 4A:
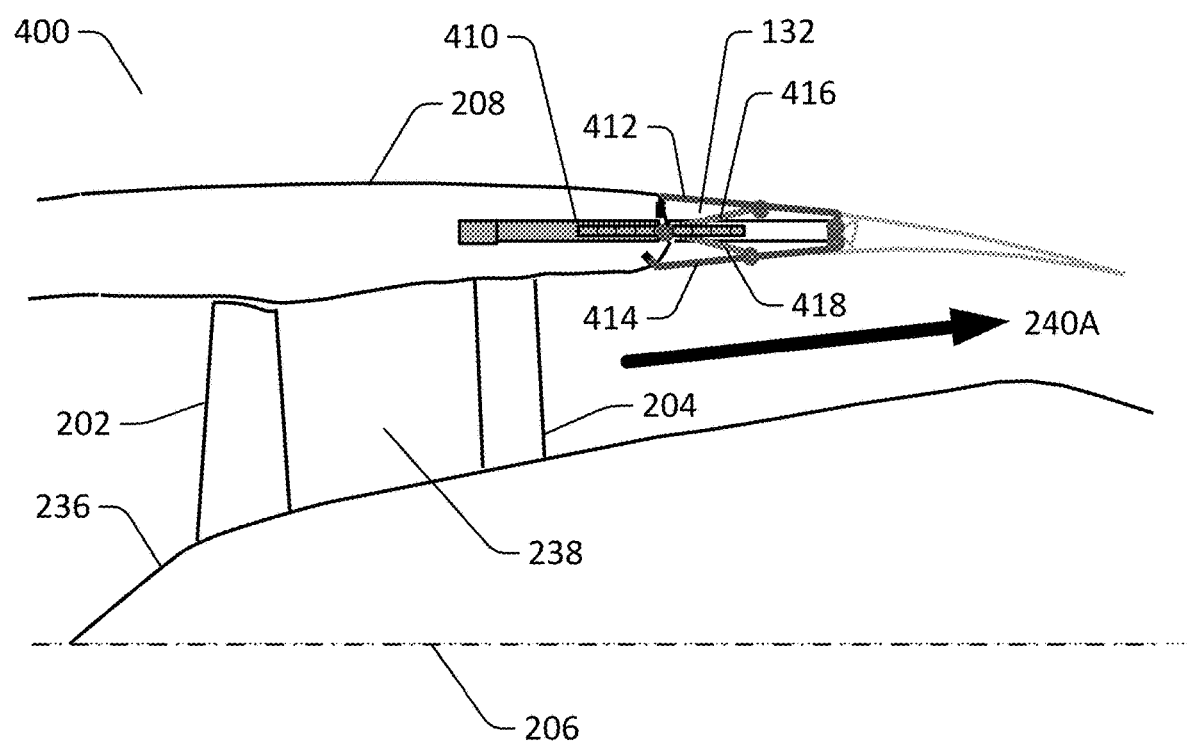
FIGS. 4A-B illustrate side cutaway views of an aircraft propulsor with a movable straight vane thrust reverser cascade in accordance with an example of the disclosure.
Figure 4B:
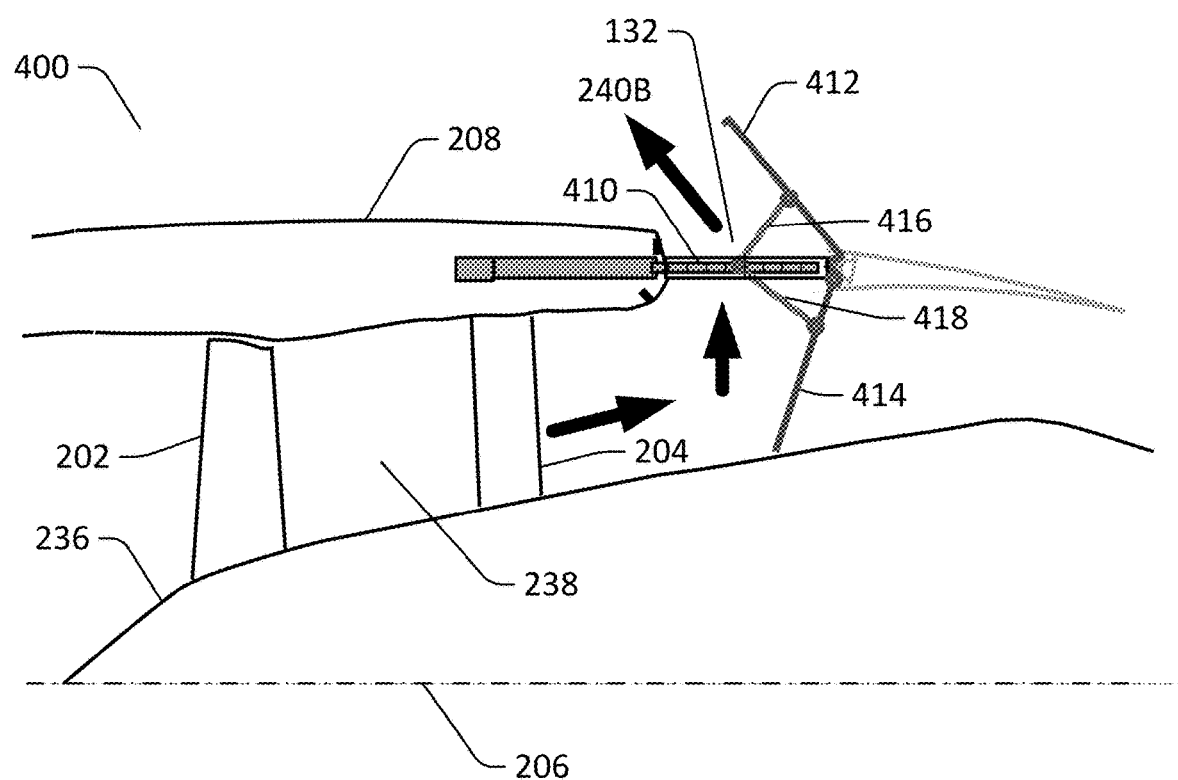

FIGS. 4A-B illustrate side cutaway views of an aircraft propulsor with a movable straight vane thrust reverser cascade in accordance with an example of the disclosure. FIGS. 4A-B may include a movable thrust reverser cascade 410. The movable thrust reverser cascade 410 may move between, at least, a first cascade position and a second cascade position. The first cascade position may be a position allowing airflow from the bypass flow path 238 through at least a portion of the movable thrust reverser cascade 410. The second cascade position may or may not be a position allowing airflow from the bypass flow path 238 through at least a portion of the movable thrust reverser cascade 410, but in certain examples, when the movable thrust reverser cascade 410 is in the second cascade position, the turning door and/or the blocker door may be in the second turning door position and/or the second blocker door position. As such, the second cascade position may be a storing position for the movable thrust reverser cascade 410 used during normal operation (e.g., when forward thrust is being generated by the aircraft propulsor 400) of the aircraft propulsor 400.

In certain examples, a turning door 412 and/or a blocker door 414 may be coupled to the movable thrust reverser cascade 410 via links 416 and/or 418. As such, the turning door 412 and/or the blocker door 414 may move with the movable thrust reverser cascade 410. Accordingly, when the movable thrust reverser cascade 410 is in the first cascade position, the turning door 412 may be in the first turning door position and/or the blocker door 414 may be in the first blocker door position. When the movable thrust reverser cascade 410 is in the second cascade position, the turning door 412 may be in the second turning door position and/or the blocker door 414 may be in the second blocker door position. Such a configuration may ensure that, when the movable thrust reverser cascade 410 is in the first cascade position and thus able to flow air through the vanes of the movable thrust reverser cascade 410, the blocker door 414 and the turning door 412 may also be in position to deflect airflow. Additionally, such configurations may be configured such that the position of the movable thrust reverser cascade 410 may not allow airflow until the blocker door 414 and/or the turning door 412 are positioned to deflect air to generate reverse thrust.

In certain such examples, movement of the movable thrust reverser cascade 410 may also move the turning door 412 and/or the blocker door 414 via the links 416 and/or 418. In such examples, one or more motors may be used to collectively move the movable thrust reverser cascade 410, the turning door 412, the blocker door 414, and/or the links 416 and/or 418.

Figure 5A:
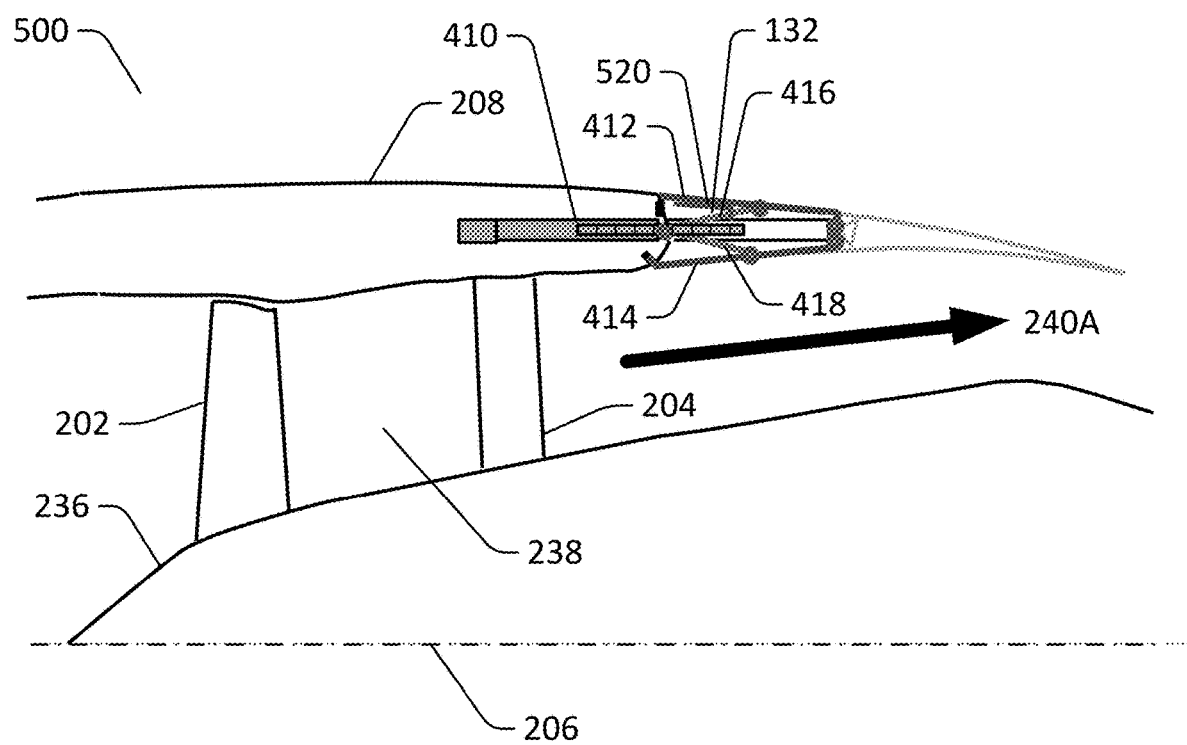
FIGS. 5A-B illustrate side cutaway views of another aircraft propulsor with a movable straight vane thrust reverser cascade in accordance with an example of the disclosure.
Figure 5B:
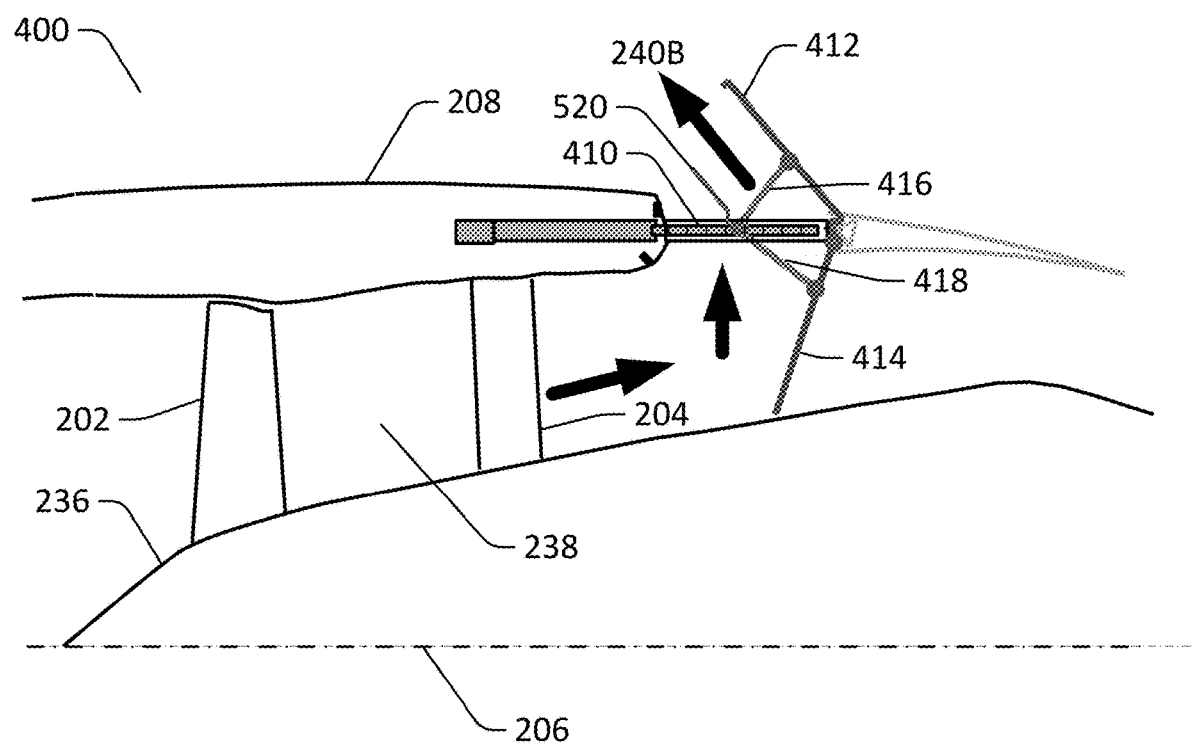

FIGS. 5A-B illustrate side cutaway views of another aircraft propulsor with a movable straight vane thrust reverser cascade in accordance with an example of the disclosure. The aircraft propulsor 500 of FIGS. 5A-B may be similar to that of the aircraft propulsor 400 of FIGS. 4A-B, but may additionally include a second turning door 520 similar to the second turning door 320 of FIGS. 3A-B. The second turning door 520 may move between, at least, a closed position. The second turning door 520 aid in the deflection of airflow from the thrust reverser cascade 210 to a direction with a component opposite that of airflow within the bypass flow path 238 and/or the direction of travel of the aircraft 50.

Figure 6A:
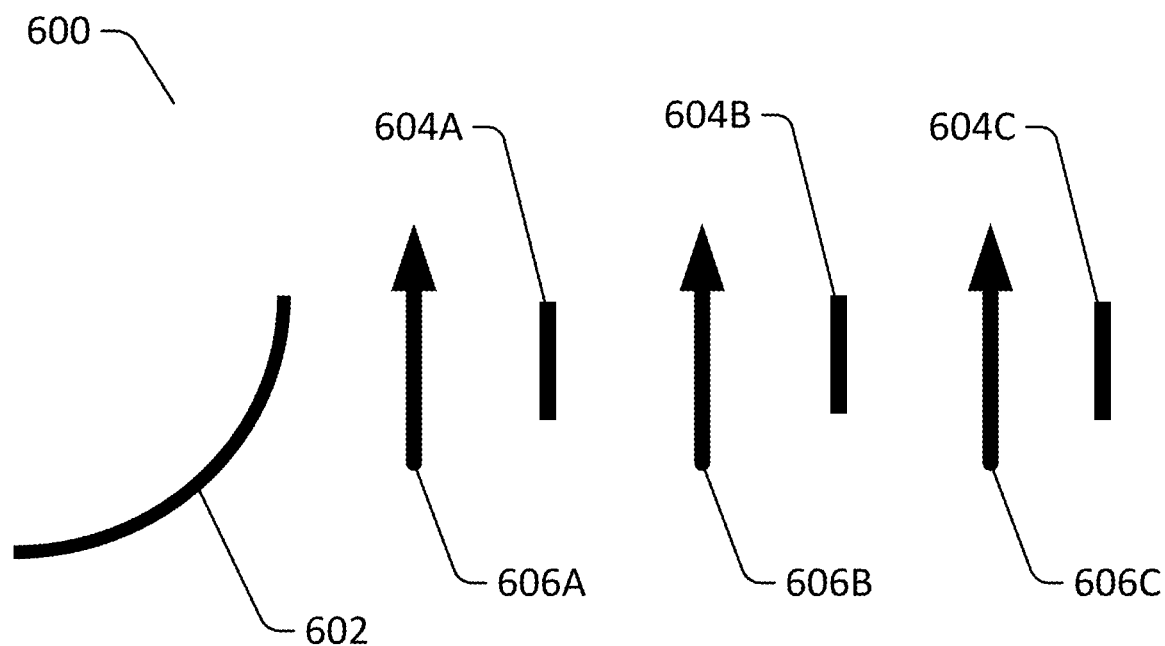
FIG. 6A illustrates a side view of a straight vane thrust reverser in accordance with an example of the disclosure.

FIG. 6A illustrates a side view of a straight vane thrust reverser in accordance with an example of the disclosure. FIG. 6A illustrates a cutaway view of at least a portion of a thrust reverser 600. The thrust reverser 600 may include a bullnose 602 and straight vanes 604A-C. The bullnose 602 may, for example, be configured to couple to a thrust reverser cascade and/or vanes of a thrust reverser cascade. Additionally, in certain examples, the cascade may include angled vanes that are configured parallel to the engine axis and not visible in this section view.

The straight vanes 604A-C may condition airflow through the thrust reverser cascade 600 to be relatively straight (e.g., airflow 606A-C through straight vanes 604A-C may flow in a direction substantially parallel to that of straight vanes 604A-C). As such, straight vanes 604A-C may allow for a greater open area of thrust reverser cascade 600 then curved vanes. Also, the straight vanes 604A-C may, due to lower impediment of flow, allow for improved pressure gradients around the bullnose. Such improved pressure gradients may also result in greater airflow through the thrust reverser cascade. The substantially straight airflow 606A-C may, after exiting the straight vanes 604A-C, be further deflected by a turning door.

Figure 6B:
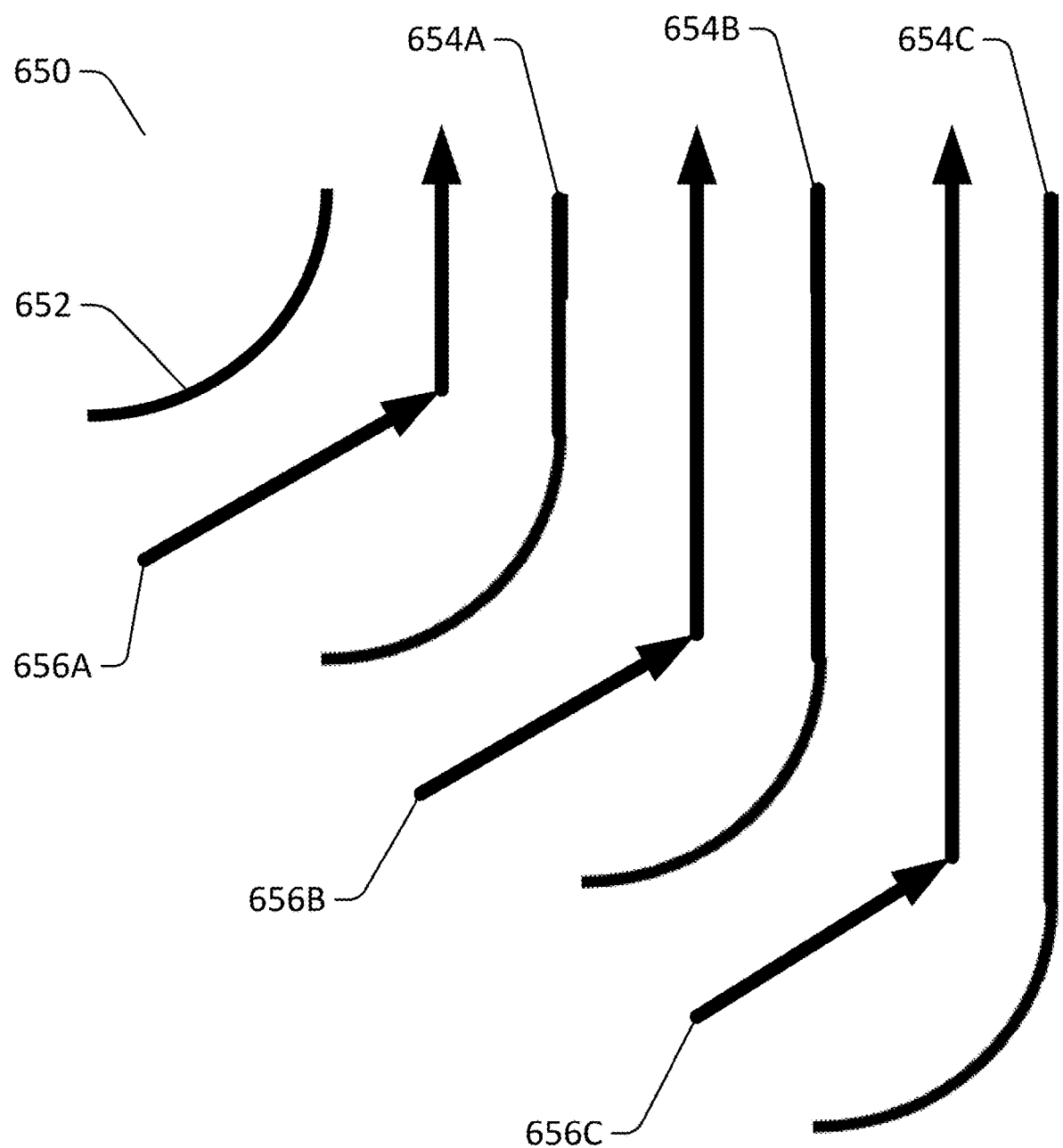
FIG. 6B illustrates a side view of another straight vane thrust reverser in accordance with an example of the disclosure.

FIG. 6B illustrates a side view of another straight vane thrust reverser in accordance with an example of the disclosure. FIG. 6B illustrates a straight vane thrust reverser with a curved inflow side. The thrust reverser 650 may include a bullnose 652 and vanes 654A-C. The vanes 654A-C may include a curved inflow side and a straight outflow side. As such, airflow 656A-C may enter the vane area through the curved inflow side, be turned via the curved vanes of the inflow side, and exit through the straight vanes of the outflow side. In certain such embodiments, the curved inflow side may supplement and/or complement blocker doors in deflecting airflow to flow through the vanes.

While FIG. 6B illustrates a curved inflow portion that includes a 90 degree curvature, other examples may include curvatures of other angles such as less than 30 degrees, less than 45 degrees, less than 60 degrees, less than 90 degrees, or 90 degrees or more. Examples with curved inflow portions with curvatures that are less than 90 degrees may include vanes where no portion are parallel to the engine axis (e.g., the axis 206), but with portions that are perpendicular to the engine axis. Additionally, for the purposes of this disclosure, "straight vanes" (e.g., the straight vanes of the outflow portion in FIG. 6B) may be substantially straight. As such, such substantially straight vanes may not be exactly perpendicular to, for example, the axis 206, and may be, for example, +/−10 degrees from perpendicular relative to the axis 206.

Figure 7A:
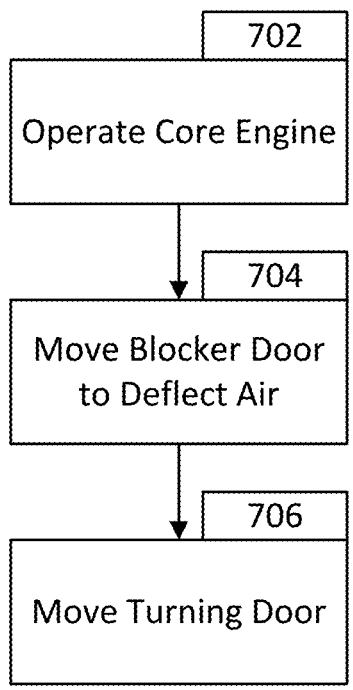
FIGS. 7A-B illustrate processes of operating an aircraft propsulor with a straight vane thrust reverser in accordance with examples of the disclosure.
Figure 7B:
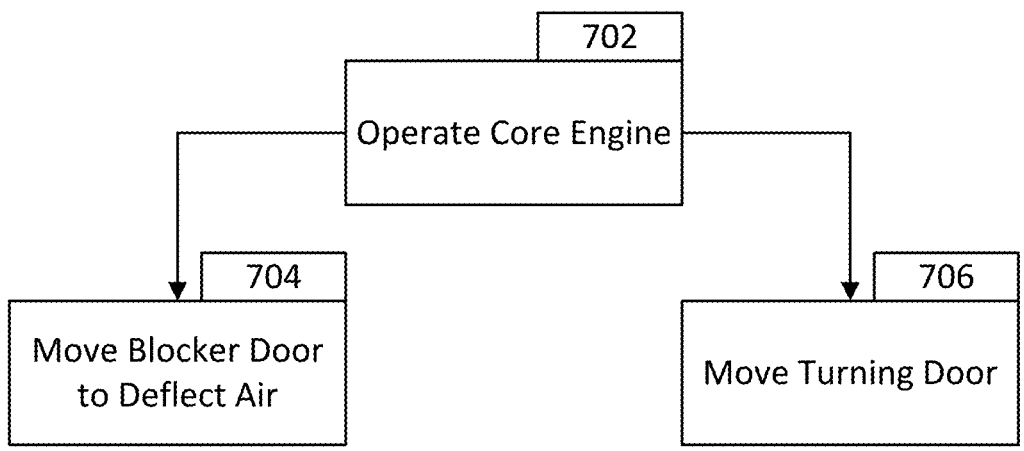

FIGS. 7A-B illustrate processes of operating an aircraft propsulor with a straight vane thrust reverser in accordance with examples of the disclosure. In block 702 of FIG. 7A, the core engine of the aircraft propulsor may be operated. As such, the core engine may, for example, provide thrust for the aircraft. Air energized by the fans of the core engine may flow in the bypass flow path of the aircraft propulsor.

In block 704, the blocker door may be operated to deflect air flowing in the bypass flow path (e.g., may be moved to a first blocker door position). The blocker door may deflect the air within the bypass flow path to a direction to flow through a thrust reverser cascade. In block 706, the turning door may be operated to deflect air flowing from the thrust reverser cascade (e.g., may be moved to a first turning door position to deflect airflow in a manner that may provide reverse thrust).

In FIG. 7B, blocks 704 and 706, operating the blocker door and the turning door, respectively, may be performed substantially simultaneously. As such, blocks 704 and 706 may be performed at the same time and/or at least a portion of the time period of operating the blocker door may overlap with at least a portion of the time period of operating the turning door. As such, in a certain example, the blocker door and the turning door may open at substantially the same time and so allow air to be deflected by the blocker door, flow through the thrust reverser cascade, and be deflected by the turning door to provide reverse thrust.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
   a nacelle comprising a thrust reverser aperture;
   a core engine circumscribed by the nacelle and comprising a plurality of fan blades configured to rotate around a first axis, wherein the nacelle and the core engine define, at least in part, a bypass flow path configured to direct airflow from the plurality of fan blades of the core engine;
   a thrust reverser cascade configured to be at least partially disposed within the thrust reverser aperture, comprising a plurality of straight cascade vanes coupled to the nacelle, arranged substantially orthogonal to the first axis, and configured to permit airflow from the bypass flow path through the cascade vanes;
   a blocker door disposed between the nacelle and the core engine and configured to move between at least a first blocker door position and a second blocker door position, wherein the blocker door in the first blocker door position blocks at least a portion of the bypass flow path; and
   a first turning door and a second turning door disposed within the thrust reverser aperture and configured to move between at least a first turning door position and a second turning door position, wherein the first turning door and the second turning door in the first turning door position are configured to deflect airflow from the cascade vanes to a direction with a component opposite that of airflow within the bypass flow path, and
   wherein the second turning door is disposed between the thrust reverser cascade and the first turning door, such that the second turning door in the second turning door position is enclosed within the thrust reverser aperture by the first turning door.

2. The aircraft propulsor of claim 1, wherein the blocker door and the first and second turning doors are coupled together.

3. The aircraft propulsor of claim 2, wherein the blocker door and the first and second turning doors are coupled together via one or more drag links.

4. The aircraft propulsor of claim 2, wherein the blocker door is configured to move from the first blocker door position to the second blocker door position substantially simultaneously with the first and second turning doors moving from the first turning door position to the second turning door position.

5. The aircraft propulsor of claim 1, wherein the blocker door is configured to move independently of the first and second turning doors.

6. The aircraft propulsor of claim 1, wherein the thrust reverser cascade is coupled to at least one of the blocker door and/or the first and second turning doors.

7. The aircraft propulsor of claim 1, wherein the thrust reverser cascade is configured to move between a first cascade position and a second cascade position, and wherein at least the first cascade position is configured to permit airflow from the bypass flow path through the cascade vanes.

8. The aircraft propulsor of claim 7, wherein the thrust reverser cascade is coupled to at least one of the blocker door and/or the first turning door, is configured to move to the first cascade position responsive to the blocker door moving to the first blocker door position and/or the first turning door moving to the first turning door position, and is configured to move to the second cascade position responsive to the blocker door moving to the second blocker door position and/or the first turning door moving to the second turning door position.

9. The aircraft propulsor of claim 1, wherein the thrust reverser cascade is fixed in a position where at least a portion of the thrust reverser cascade is disposed within the thrust reverser aperture.

10. The aircraft propulsor of claim 1, wherein the second turning door is configured to move responsive to movement of the first turning door.

11. The aircraft propulsor of claim 1, wherein the direction with the component opposite that of airflow within the bypass flow path is a direction 135 degrees or more relative to the airflow energized by the core engine within the bypass flow path.

12. The aircraft propulsor of claim 1, wherein the thrust reverser cascade is disposed circumferentially around the core engine, and wherein each straight cascade vane is arranged substantially orthogonal to the first axis.

13. The aircraft propulsor of claim 1, wherein the thrust reverser cascade further comprises angled and/or curved vanes, wherein at least a portion of the angled and/or curved vanes are parallel to the first axis.

14. An aircraft comprising the aircraft propulsor of claim 1, the aircraft comprising:
a fuselage; and
a wing, wherein the aircraft propulsor is coupled to at least one of the fuselage and/or the wing.

15. The aircraft of claim 14, further comprising:
a controller, communicatively coupled to the blocker door and/or the first and second turning doors and configured to provide instructions to move the blocker door between the first blocker door position and the second blocker door position and/or move the first and second turning doors between the first turning door position and the second turning door position, wherein the blocker door and the first and second turning doors are coupled together and the controller is communicatively coupled to the blocker door or the first and second turning doors.

16. The aircraft of claim 15, wherein the blocker door is configured to move independently of the first and second turning doors and the controller is communicatively coupled to the blocker door and the first and second turning doors.

17. A method of operating the aircraft propulsor of claim 1, comprising:
operating the core engine by rotating the plurality of fan blades around the first axis to direct airflow through at least the bypass flow path of the aircraft propulsor;
moving the blocker door to the first blocker door position to flow air from the bypass flow path through the thrust reverser cascade; and
moving the first turning door and the second turning door to the first turning door position to deflect airflow from the cascade vanes to the direction with the component opposite that of airflow within the bypass flow path.

18. The method of claim 17, wherein the blocker door and the first and second turning doors are moved substantially simultaneously.

* * * * *